United States Patent
Wang

(10) Patent No.: US 7,251,509 B1
(45) Date of Patent: *Jul. 31, 2007

(54) MOBILE DEVICE WITH CELL ARRAY

(76) Inventor: Shay-Ping Thomas Wang, 1701 Edgewood La., Long Grove, IL (US) 60047

( * ) Notice: Subject to any disclaimer, the term of this patent is extended or adjusted under 35 U.S.C. 154(b) by 0 days.

This patent is subject to a terminal disclaimer.

(21) Appl. No.: 11/567,397

(22) Filed: Dec. 6, 2006

Related U.S. Application Data

(63) Continuation of application No. 11/459,480, filed on Jul. 24, 2006.

(60) Provisional application No. 60/776,428, filed on Feb. 24, 2006, provisional application No. 60/804,466, filed on Jun. 12, 2006.

(51) Int. Cl.
*H04Q 7/20* (2006.01)

(52) U.S. Cl. ...................... 455/574; 455/573

(58) Field of Classification Search ............. 455/571, 455/572, 573, 574, 343.1, 343.5, 343.6, 575.1; 320/101, 102, 130, 114, 162, 142; 136/246, 136/251, 291, 244, 293; 429/9, 48
See application file for complete search history.

(56) References Cited

U.S. PATENT DOCUMENTS

| | | | | |
|---|---|---|---|---|
| 4,009,051 A | | 2/1977 | Kazis et al. | |
| 4,122,396 A | | 10/1978 | Grazier et al. | |
| 4,401,935 A | * | 8/1983 | Yerkes | 320/102 |
| 5,137,271 A | * | 8/1992 | Frankel | 482/35 |
| 5,327,071 A | * | 7/1994 | Frederick et al. | 323/299 |
| 5,898,932 A | | 4/1999 | Zurlo et al. | |
| 6,133,871 A | * | 10/2000 | Krasner | 342/357.06 |
| 6,316,925 B1 | * | 11/2001 | Canter | 323/282 |
| 6,472,846 B1 | * | 10/2002 | Hutchinson et al. | 320/114 |
| 6,847,834 B1 | | 1/2005 | Leem | |
| 6,977,479 B2 | | 12/2005 | Hsu | |
| 7,038,333 B2 | | 5/2006 | Bourilkov et al. | |
| 7,095,213 B2 | | 8/2006 | Weng | |
| 2003/0096642 A1 | | 5/2003 | Bessa et al. | |
| 2005/0061361 A1 | | 3/2005 | Ochi et al. | |
| 2005/0076551 A1 | * | 4/2005 | Silverstone et al. | 40/568 |
| 2005/0282591 A1 | | 12/2005 | Shaff | |
| 2006/0113961 A1 | * | 6/2006 | Weng | 320/138 |

* cited by examiner

*Primary Examiner*—Jean Gelin
(74) *Attorney, Agent, or Firm*—Adam K Sacharoff; Much Shelist

(57) ABSTRACT

A mobile terminal having one or more of the following modes: a standby mode, talk mode, send/receive mode, and read/write mode, includes a cell array being capable of providing a cell array power and a backup battery being capable of providing battery power. The mobile terminal has a power management system that when the mobile terminal enters standby mode and/or read/write mode, has the ability to supply the mobile terminal with only cell array power. The power management system further has, when the mobile terminal enters talk mode and/or send/receive mode, the ability to supply the mobile terminal with battery power and/or cell array power. In both events, the power management system has the ability to send any excess cell array power to recharge the battery.

4 Claims, 10 Drawing Sheets

FIG. 1 Mobile Phone with Cell Arrays

FIG. 2 Cell Arrays Circuitry

FIG. 3  Mobile Phone Diagram

FIG. 4 Mobile Phone Diagram with Cell Arrays

FIG. 5 Standby Mode Operation

FIG. 6 Talk Mode Operation

FIG. 7 Text Messaging Application

FIG. 8 E-mail Application

MOBILE DEVICE WITH CELL ARRAY

CROSS REFERENCE TO RELATED APPLICATIONS

This application is a Continuation of U.S. application Ser. No. 11/459,480 filed Jul. 24, 2006, which claims priority to Provisional Application 60/776,428 filed Feb. 24, 2006 and claims priority to Provisional Application 60/804,466 filed Jun. 12, 2006.

FIELD OF THE INVENTION

The present invention relates to mobile devices and more particularly to providing power for operating the mobile devices.

BACKGROUND OF THE INVENTION

Existing mobile devices requires a battery to operate. If the battery exhausts the power, all features are rendered useless, preventing even basic or necessary functions, for example, communication with others, or making a 911-call. In providing alternate power sources, there are Solar-panels, which are bulky, and not designed for the general public; High-density batteries, which will exhaust eventually, and need recharge; or Rapid-charging batteries, which again will suffer the same shortcomings as normal recharging batteries.

The prior art has also been developed somewhat over the years. For example, U.S. Pat. No. 6,847,834 is entitled Mobile Terminal With A Solar Cell. The '834 patent covers a mobile device with a flip cover that has solar cells attached to the outer surface of the flip cover. The '834 patent further includes a voltage booster such that the voltage of the solar cells are boosted prior to being sent to the batteries and the mobile device. The power management circuitry disclosed by the '834 patent covers a mobile device that uses the rechargeable batteries as its primary power. Only when the batteries are fully charged or when the solar cells voltage is greater than the batteries will the mobile device use the solar cells to power the device.

U.S. Pat. No. 6,997,479 is entitled Portable Cell Phone Battery Charger Using Solar Energy As The Primary Source of Power. The '479 patent covers an apparatus that is external to the mobile device. The apparatus has solar panels and batteries contained therein such that the apparatus may recharge or power the mobile device either with the solar arrays or by the batteries contained in the apparatus.

U.S. Pat. No. 5,898,932 is entitled Portable Cellular Phone With Integral Panel. The '932 patent includes a cellular phone having a rear face covered with solar panels. The solar panels are used to recharge the batteries in the cell phone.

US Patent Application Publication 2005/0282591 is entitled Solar-Powered Mobile Telephone. The '591 publication application discloses supplementing battery power with solar power.

There is a need for improvements in the industry of powering electronic devices. And the present invention through its embodiments provides for alternatives and improvements over the prior art.

SUMMARY OF THE INVENTION

The present invention includes a mobile device with cell arrays used to assist in the power management of the device. The cell array enables the device to be smaller, thinner, cheaper, and have a nearly never-ending live span or battery drain. This permits the device to have nearly uninterrupted email application; unlimited Standby time; nearly uninterrupted Talk time; nearly uninterrupted text messaging application; nearly uninterrupted Safety/Emergency application; nearly uninterrupted search engine application; and uninterrupted content broadcast application.

In addition to any type of mobile device, the present invention when used in mobile phones adds a level of safety that is not found in the prior art. Since existing mobile phones are powered by battery, once the battery is depleted, all mobile phone features cease to operate. This can be quite dangerous especially because once the mobile device is non-operational, the user is unable to place emergency calls to the police and fire. For safety reasons, it is extremely important that a mobile device is operational anytime anywhere. Many solutions are proposed to prolong the battery life for longer Standby time and Talk time. Unfortunately, once the battery runs out of energy the phones are dead.

In the present invention, the cell arrays are built in a mobile phone. The cell arrays convert sunlight, ambient light, even starlight into electricity to power the mobile phone. The present invention enables the mobile phone to operate anytime and anywhere.

In one embodiment there is provided a power management system for a mobile phone or electronic device that has as a primary power source a cell array and has as a backup power source a battery. The power management system includes a first switch positioned to control power to and/or from the cell array; and a second switch positioned to control power to and/or from the battery supply, wherein the first switch and the second switch, in response to a power requirement from the mobile phone being equal to and/or less than an cell array power provided by the cell array, set to supply the mobile phone only cell array power, and wherein the first switch and the second switch, in response to the power requirement from the mobile phone being greater than the cell array power but less than a combined power provided from the cell array and the battery, set to supply the mobile phone cell array power and battery power provided by the battery.

The power management system may also have a rechargeable battery. And the first switch and the second switch, in response to the power requirement from the mobile phone being greater than the combined power provided from the cell array and the battery, set to supply the battery cell array power.

The mobile phone may also be capable of being attached to an external charger that is capable of providing charger power. The power management system further includes a third switch, which in response to the charger power being present, set to supply the mobile phone with the charger power. In addition, the power management system may have the ability to set the second and third switches, in response to said charger power being present, such that power from the external charger is also used to recharge the battery.

In addition, the power management system may have the ability to set the first and third switches, in response to said charger power being present, such that power from the external charger to power the cell array.

In the above scenarios the ability to set switches may include the ability to turn the switches on/off and/or to an intermediate position such that the power flows in the proper directions.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DESCRIPTION OF THE INVENTION

Figure 1:
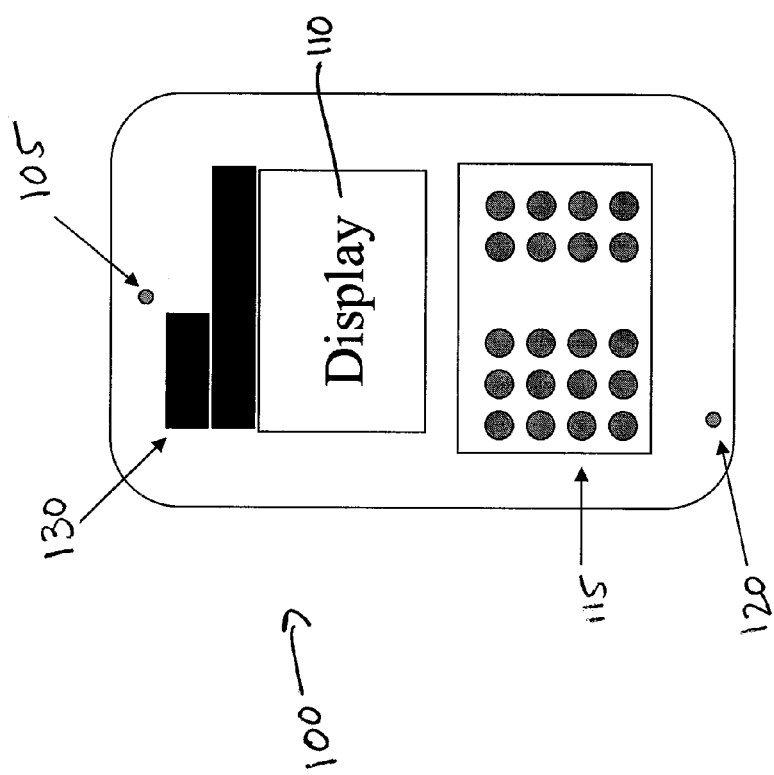
FIG. 1 is a front view of a mobile phone with cell arrays used as a primary power supply.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

The present invention overcomes these shortcomings by providing cell arrays to convert ambient light (or heat) into electricity to power a mobile device. A mobile device powered by the present invention is smaller, thinner, lighter, and cheaper. The present invention is able to drive the next mobile revolution in technology and business.

The present invention mobile devices have the cell arrays to convert ambient light or heat into electricity and store the energy. The terms "cell array" and "cell arrays" are used interchangeable and are not intended to limit the number used or contemplated by the present invention. In addition, "cell array" as used is not a limitation on the type of cell used to collect heat or light and have the same converted into energy or power.

The present invention may also be included in battery operated mobile devices as a backup. For example, once the battery is depleted, the mobile device can be placed in a Miser Mode (M-mode). The mobile device, once in the M-mode is powered by the cell arrays, providing some or all the tasks that the mobile device currently has.

The present invention is suitable for the following markets: general public, as consumers want a smaller, thinner, lighter, cheaper and ever-lasting mobile device; disposable market, inexpensive devices, and no hazardous material; search engine market, providing search engines in mobility; sports market, never worry about losing communication in outdoor activities; mobile services, such as "ON STAR" service offered by General Motor; transportation market, software can track trucks and manage inventory; police, fire department, and homeland security; and communication with those who need help.

The present invention will allow mobile devices to become smaller, thinner, lighter, cheaper, and environmentally friendlier. Text messaging, emails, and voice dialogue will not fail because the cell arrays are providing nearly uninterrupted service any time and any place.

Business platforms will be directed to search engines to take multi-media queries including text messages/voice dialogue/graphics/video any time, any place; display businesses will increase as the present invention is multi-functional to double light (or heat) collector for cell arrays; mobile service businesses will be able to fully comprise roadside assistance, location-based service, and rescue missions. Transportation businesses can benefit as delivery services, truck stops planning/monitoring, and inventory management can be done quickly and efficiently.

FIG. 1 illustrates a mobile device 100 with cell arrays in accordance to an embodiment of the invention. As with most or all mobile devices, the mobile device 100 would include a speaker 105, display 110, keypad 115 (numeric, alpha, or alphanumeric), and a microphone 120. In addition, the mobile device 100 includes cell arrays 130 to convert light into electricity. The generated electricity is stored in a storage area, which is completely rechargeable. The cell array can convert light, sunlight, ambient light, star light, or even heat into electricity. The mobile devices that can use the present invention include cellular phones, PDA's, PDA phones, Cordless phones, Remote control devices (TV, DVD), Instruments (clocks), and other electronic devices.

Figure 2:
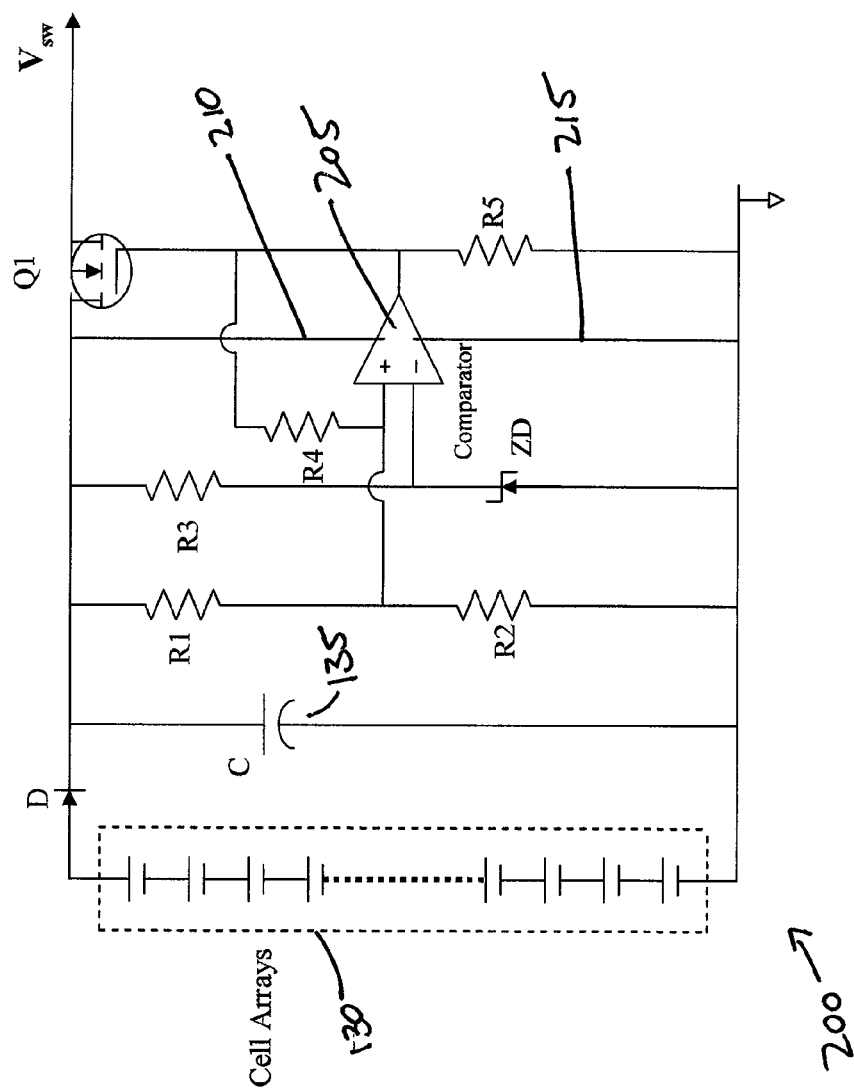
FIG. 2 is a cell array circuit schematic.

FIG. 2 shows an embodiment of a typical cell array circuitry 200 used in accordance with the prior art, such can be found published on www.national.com/nationaledge/nov05/article.html, which is incorporated herein by reference. In FIG. 2, the cell arrays 130 collect energy from diffused sources, convert it into electricity, and store in a capacitor 135 (C). Typical cell arrays produce 10 mA current and 3-4.9V voltage (Vsw). The designs of cell arrays and placement may easily vary in other embodiments and may be dictated by certain requirements of the devices. An important aspect of the present embodiment is that a booster is not needed in the electronic device, a major divergence from the prior art.

As illustrated in FIG. 2 resistors 1 and 2 (R1 and R2) are voltage dividers. A zener diode (ZD) ensures a constant voltage, and resistor 3 (R3) protects the zener diode ZD from overloading. A comparator 205 provides a output voltage to turn on/off a switch Q1. If Vsw is too low (voltage at R2 is lower than voltage at ZD), then the comparator 205 output is zero to which turns off the switch Q1. If the voltage at R2 is higher than the voltage at ZD then the switch Q1 is turned on. The two lines 210 and 215 provide bias for the comparator 205. The top one 210 is voltage from the cell array and the bottom line 215 is ground.

Figure 3:
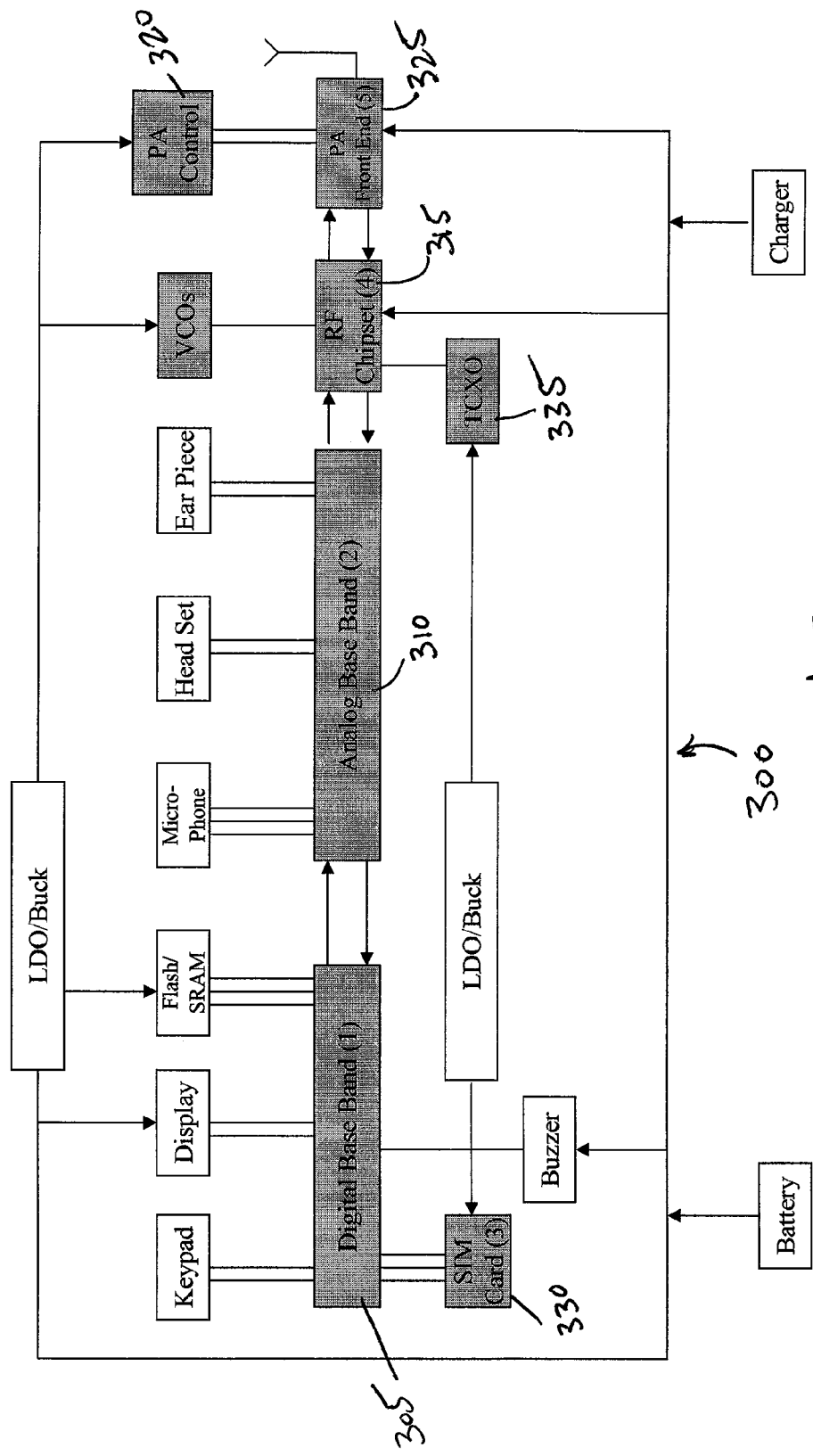
FIG. 3 is a mobile phone diagram in accordance with the prior art.

FIG. 3 shows a typical mobile phone block diagram 300. The main functional blocks include Digital Base Band, Analogy Base Band, SIM card, RF chipset, Power Amplifiers, and others (memory, display, keypad, etc.). The blocks with high current consumption are the digital base band 305, the analog base band 310, the RF chipset 315, the PA control 320, the PA Front End chip 325, the SIM Card 330 and the temperature-compensated crystal oscillator TCXO chip 335. TABLE 1, below, shows the current consumption of a typical mobile phone.

TABLE 1

|  | Average Current Consumption in Talk Mode | Average Current Consumption in Standby Mode |
| --- | --- | --- |
| Sub circuit | mA | mA |
| 1) Digital Base Band & Memory | 25 | 0.34 |
| 2) Analog Base Band | 9 | 0.15 |
| 3) SIM | 1 | 0.06 |
| 4) RF | 32 | 0.05 |
| 5) PA | 200 | 0.77 |
| 6) PM (Housekeeping) | 3 | 0.22 |
| 7) Misc. Other | 5 | 0.67 |
| Total Current Consumption | 275 | 2.26 |

Figure 4:
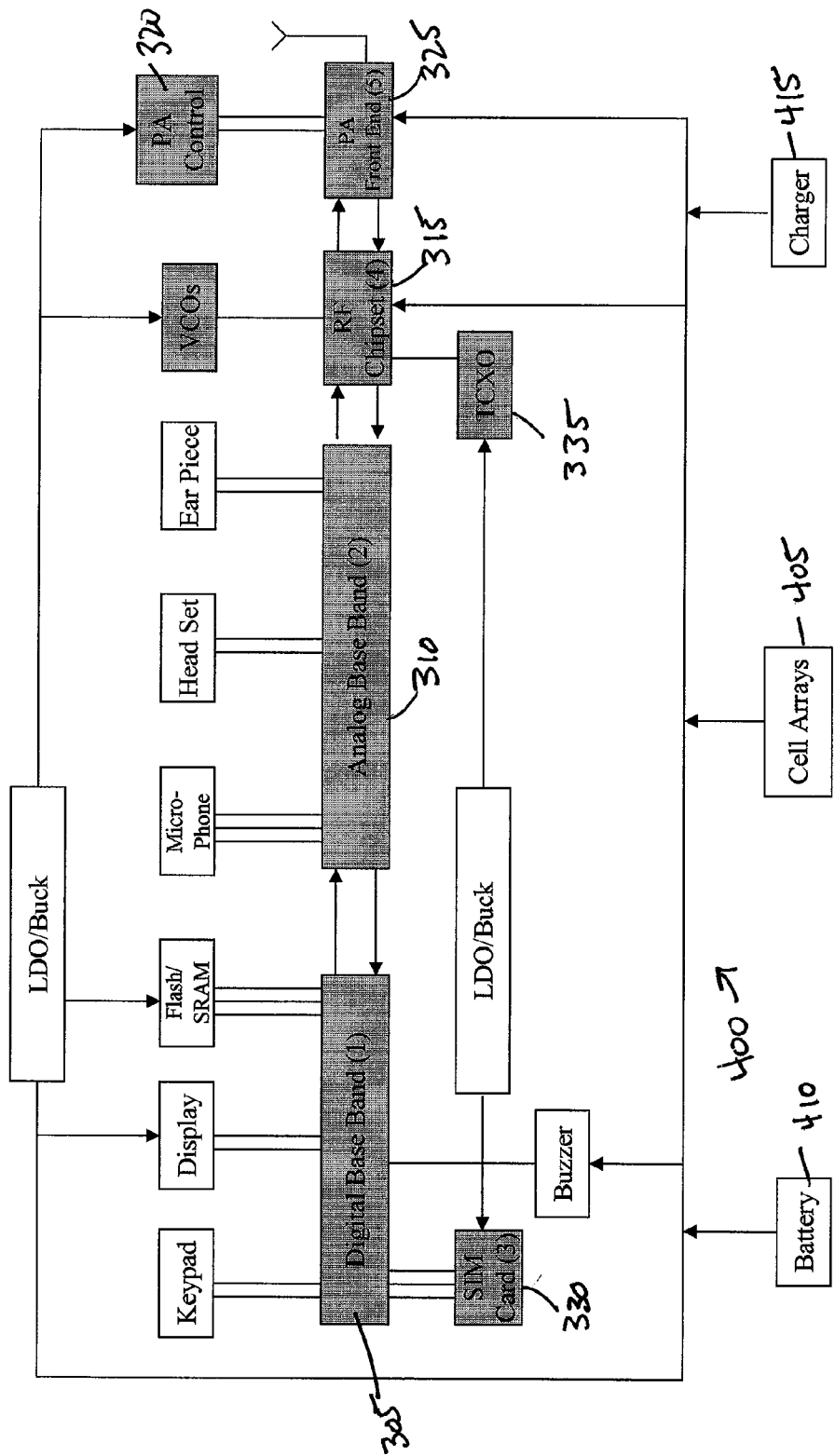
FIG. 4 is a mobile phone diagram in accordance with an embodiment of the invention.

FIG. 4 is block diagram 400 of an embodiment of mobile phone with cell arrays. The cell arrays 405 may be connected to the same power line as the battery 410 and charger 415, therefore the cell arrays 405 may power the mobile phone directly and the cell arrays may charge the battery if the battery is low.

The electronic device is assumed to have various known functions known in the industry and the below examples and description are directed to explain the power management of the electronic device, with a greater more detailed explanation following the examples. All of the examples may not be necessary for the electronic device as any one or all may be utilized.

Figure 5:
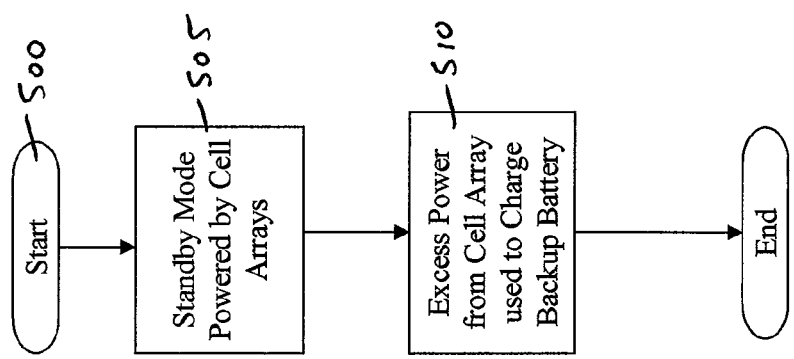
FIG. 5 is a block diagram of a mobile phone in Standby Mode in accordance with an embodiment of the invention.

FIG. 5 is an embodiment of Standby Mode operation (box 500) enabled by the invention. The cell arrays have a power output of about 10 mA. It is well known that mobile electronic devices only require about 2.26 mA to function in the Standby Mode. Therefore the mobile electronic device is completely capable of functioning entirely off of the cell array (box 505). The condition of the backup battery (fully charged, low, or depleted) in the mobile electronic device is immaterial. Because the battery power is not being utilized in the Standby Mode, unlimited Standby time can virtually be achieved regardless of the battery condition. The difference in the cell array power or the spare current (7.74 mA) can be used to charge the backup battery (box 510).

Figure 6:
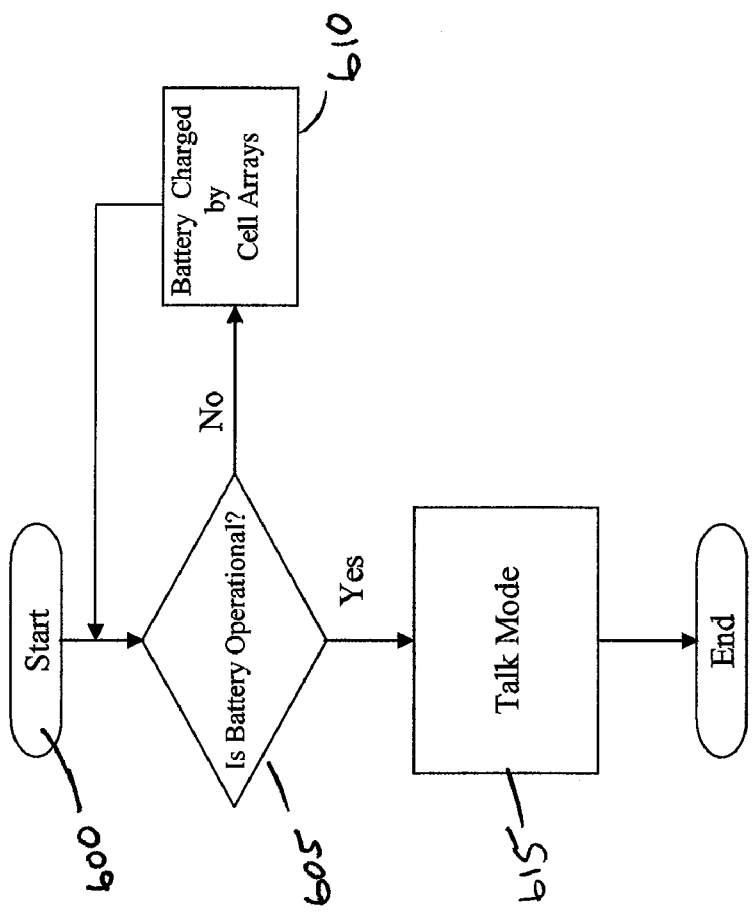
FIG. 6 is a block diagram of a mobile phone in talk mode in accordance with an embodiment of the invention.

FIG. 6 is an embodiment of Talk Mode operation. Talk Mode consumes a large quantity of current, about 275 mA, which far exceeds the cell arrays output current of about 10 mA. Since the Talk Mode power consumption exceeds a predetermined output current set by the cell array, the Talk Mode is powered by the backup battery. With the cell arrays being used to charge the battery. To activate Talk Mode (box 600), the battery condition is checked (box 605). If the battery is not operational, the cell arrays charge the battery to operational level (box 610). The operational level of battery is defined as the talk time enabled by the battery, which is determined by the charging time, or voltage level. If the battery is operational, Talk Mode is activated (box 615). The present invention would enable nearly uninterrupted Talk time.

Figure 7:
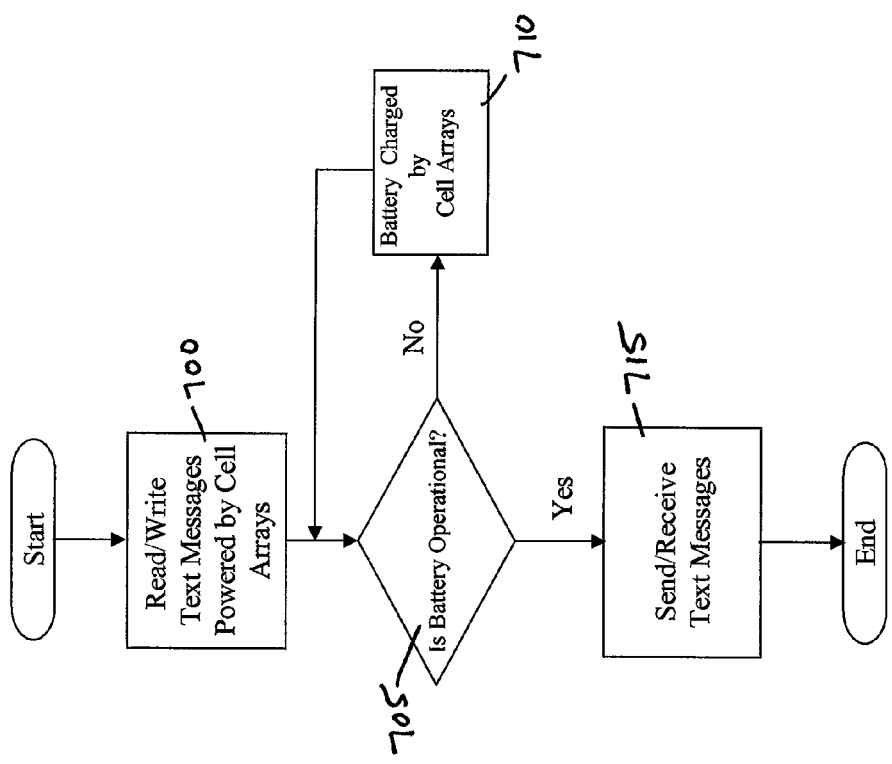
FIG. 7 is a block diagram of a mobile phone in text messaging mode in accordance with an embodiment of the invention.

FIG. 7 is an embodiment of text messaging application. The Read (or Write) operation in text messaging application, which consumes little current (less than 1 mA), is powered directly by the cell arrays (box 700). The battery condition (fully charged, low, or depleted) is immaterial in the Read (or Write) operation because the cell arrays power the mobile phone directly. This invention enables the user to read (or write) a text message as long as it takes regardless battery condition. The Send (or Receive) operation, which consumes large current (275 mA), is powered by the backup battery. The battery condition is checked for the Send (or Receive) operation (box 705). If the battery is not operational, the cell arrays charges the battery to operational level (box 710). If the battery is operational, the text message is sent (or received) (box 715).

TABLE 2, below, shows the numbers of text message sent/received for 1-minute talk time.

TABLE 2

| Length | Transmission Time | Numbers |
| --- | --- | --- |
| 8 letters | 1 m sec | 60,000 |
| 40 letters | 5 m sec | 12,000 |
| 80 letters | 10 m sec | 6,000 |

Note: GPRS service (64 kbps) is assumed.

In TABLE 2, the mobile phone with cell array enables the user to send/receive 6,000 text messages (each is 80 letters long) for 1-minute talk time, thereby, enabling nearly uninterrupted text messaging application.

Figure 8:
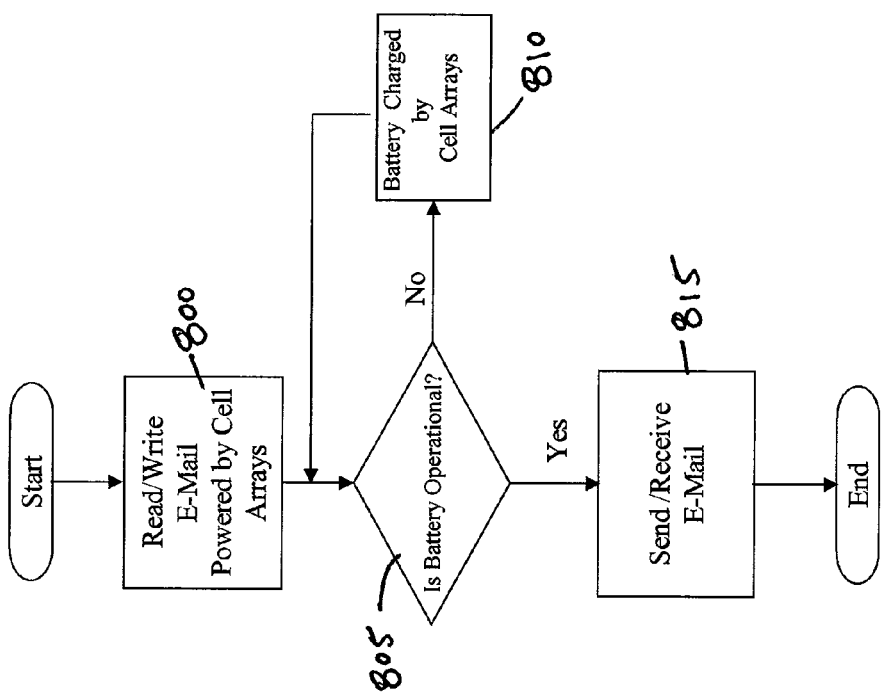
FIG. 8 is a block diagram of a mobile phone in an email mode in accordance with an embodiment of the invention.

FIG. 8 is an embodiment of an E-mail application. The Read (or Write) operation in E-mail application, which consumes little current (less than 1 mA), is powered directly by cell arrays (box 800). This enables the user to read (or write) an email as long as it takes regardless battery condition. The backup battery condition (fully charged, low, or depleted) is immaterial in the Read (or Write) operation because the cell arrays power the mobile phone directly. Similar to the Text Send/Receive Operation above, the E-mail application also has Send (or Receive) operation, which consumes a large amount of current (275 mA) and is therefore powered by the battery. The battery condition is checked for Send (or Receive) operation (box 805). If the battery is not operational, the cell arrays charges the battery to operational level (box 810). If the battery is operational, the email is sent (or received) (box 815).

TABLE 3 shows the numbers of emails sent/received for 1 minute talk time.

TABLE 3

| Length | Transmission Time | Numbers |
| --- | --- | --- |
| 80 letters | 10 m sec | 6,000 |
| 400 letters | 50 m sec | 1,200 |
| 800 letters | 100 m sec | 600 |

Note: GPRS service (64 kbps) is assumed.

In TABLE 3, the present invention enables the user to send/receive 600 emails (each is 800 letters long) for 1-minute talk time.

The present invention discusses at various points current and voltage as thresholds. However, power can also be used herein as a threshold. And for practical purposes, the term power is used herein to generally define current, voltage and/or power requirements.

Figure 9:
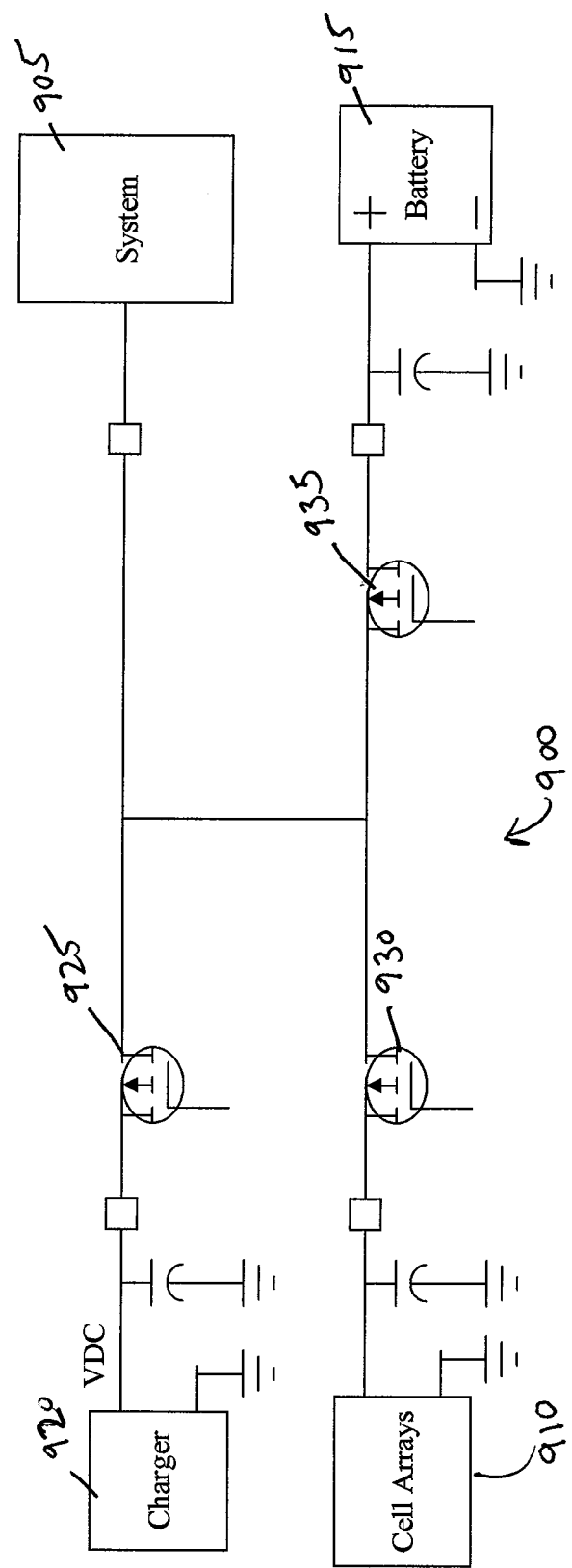
FIG. 9 is a simplified schematic of a power management circuit in accordance with an embodiment of the invention.

Referring now to FIG. 9, there is shown a power management chip 900 block diagram for operating an electronic mobile device or other type of electronic mobile or portable system 905. Power management system 900 includes three power inputs for receiving power from a Cell Array 910, a backup battery 915, and a charger 920. Unlike all typical electronic portable systems, the backup battery 915 provided with the device is not the primary source of power for the system 905. The primary source of power for the system 905 comes from the cell array 910. The power management chip 900 only allows the portable system 905 to draw power from the backup battery 915 when the power requirements from the portable system 905 exceed the power available from the cell array 910.

Three switches are used by the present invention to control the power flow through the power management chip 900. The switches may also be relays and designed to respond to either a current or voltage change by activating switches or other devices. As shown in FIG. 9, the power management chip 900 uses a charger switch 925, a cell array switch 930, and a backup battery switch 935. The charger switch 925 monitors the power coming into the power management chip 900 from the charger 920 (referred to as $P_{charger}$). If the $P_{charger}$ is greater than a charger switch preset value the charger switch 925 is turned on such that $P_{charger}$ can power the system.

The cell array switch 930 is used to control the power coming into the power management chip 900 from the cell array 910 (referred to as $P_{array}$). When the power management chip 900 identifies that the power requirements (referred to as $P_{req}$) for the system 905 at any given time is below the $P_{array}$ coming into the power management chip 900, the cell array switch 930 is turned on to allow the $P_{array}$ to power the system 905. In addition, when the $P_{array}$ is greater than $P_{req}$ the backup battery switch 935 is turned on such that any additional $P_{array}$ not being used by the system 905 is used to charge the backup battery.

The backup battery switch 935 is also used to control the power coming into the power management chip 900 from the backup battery 915 (referred to as $P_{battery}$). When the power management chip 900 identifies that the $P_{req}$ is greater than $P_{array}$, the backup battery switch 935 is turned on to allow the $P_{battery}$ to power the system 905 along with the $P_{array}$. This would also happen when $P_{array}$ drops below the $P_{req}$, for example, when the system 905 is being used in places without light sufficient to run the cell arrays 910. In addition, when the backup battery switch 935 is turned on to allow $P_{Battery}$ to add power to the system 905, any $P_{array}$ not being used by the system may be used to charge the backup battery.

In addition, when the charger is present the backup battery 915 and the cell array 910 may be charged based on predetermined charger values set in the backup battery switch 935 and the cell array switch 930, respectively.

Figure 10:
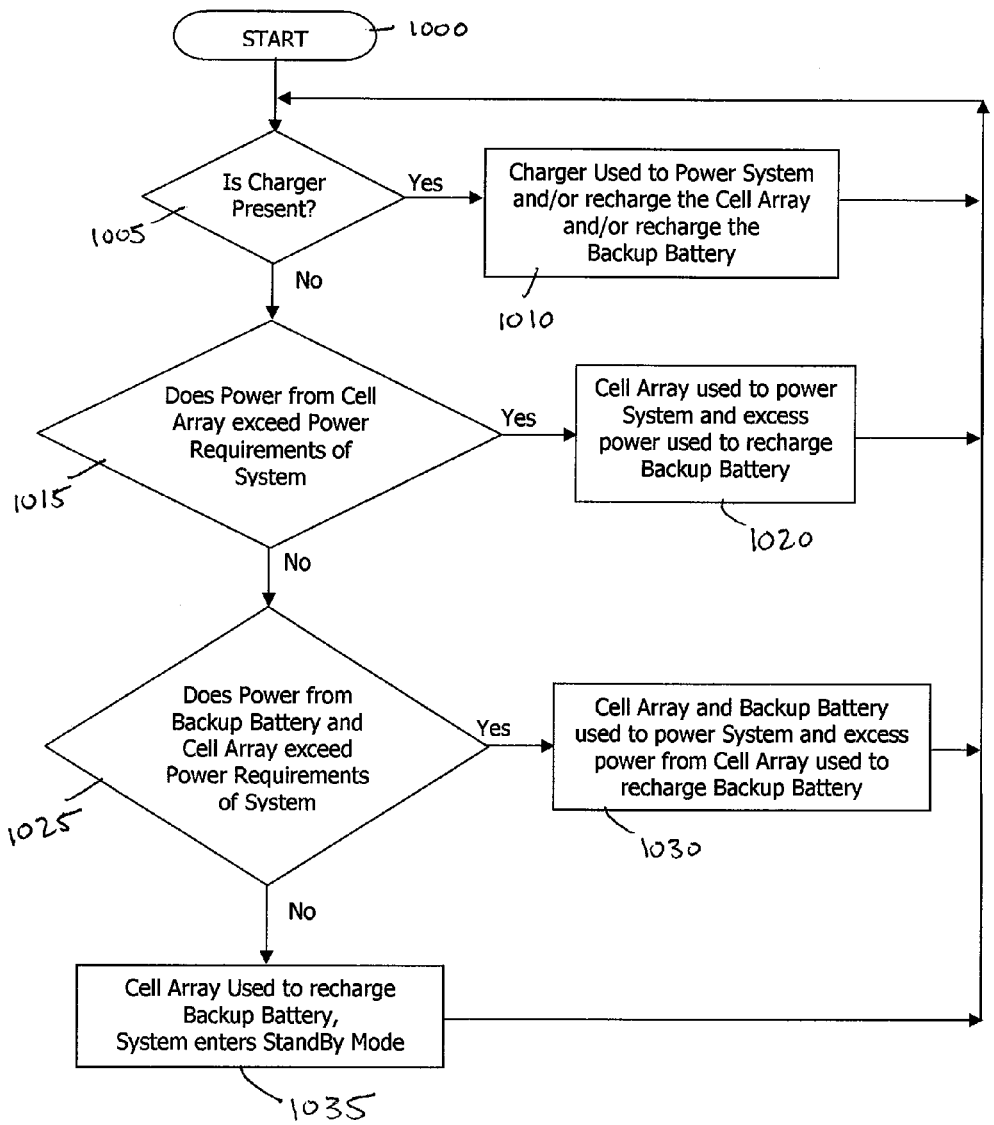
FIG. 10 is a method block diagram of a power management in accordance with an embodiment of the invention.

Referring now to FIG. 10, there is shown a power management operation in accordance to one embodiment of the present invention. The power management determines if the charger 920 is present (box 1005). If the charger 920 is present, the charger is used to power the system 905 and/or recharge the Cell Array 910 and/or recharge the Backup Battery 915 (Box 1010). If the charger 920 is not present, the power management determines if power from the cell array 910 exceeds the power requirements of the system 905 (Box 1015). If the power from the Cell Array exceeds the power requirements, the Cell Array 910 is used to power the System 905 and any excess power from the Cell Array 910 is used to recharge the Backup Battery 915 (Box 1020). If the power form the Cell Array 910 does not exceed the power requirements, the power management determines if power from the Backup Battery 915 and the Cell Array 910 would exceed the power requirements of the System 905 (Box 1025). If the power from both the Cell Array 910 and the Backup Battery 915 exceeds the power requirements of the System 905 (coming from Box 1025), then the power from the Cell Array 910 and the Backup Battery 915 is used to power the System and any excess power from the Cell Array 910 can be used to recharge the Backup Battery (Box 1030). If the power requirements of the System 905 is greater then the power from the Cell Array 910 and the Backup Battery 915, the System would enter a StandBy mode and any power from the Cell Array 910 would be used to recharge the Backup Battery 915 (Box 1035). The power management would then return to the beginning methodology.

Various applications and embodiments may be achieved with the present invention. Some of which may include the following: (1) Mobile devices with cell arrays, such as but not limited to mobile phone, PDA's, and cordless phone, any stationary communication devices; (2) one or multiple cell arrays can be placed in the mobile device; (3) the cell arrays may comprise a telescopic type design, such that that can be pulled to extend out of the mobile device; (4) the cell arrays may comprise a clamshell (flip) type design; (5) the cell arrays may be in the case or holder of a mobile phone; (6) the cell arrays may reside in a mobile phone; and (7) a lens (fish eye shape) may be used to collect surrounding light for the cell arrays reside in a mobile device.

The cell arrays typically produce 10 mA current, and 3-4.9V voltage, however the cell arrays may produce up to 1 A current, and up to 15V voltage for some applications.

Since the current and voltage output from cell arrays are sometimes unstable due to movement or change of lighting, to maintain data integrity: (1) Keypad entries are stored in the nonvolatile memory (flash); and (2) all real-time data (text messages, emails) are stored in the nonvolatile memory.

Various power management designs and the utilization of the cell arrays and batteries alone and together are made in the embodiments of the present invention. In summary of a (1) Standby Mode operation—the cell arrays power the mobile phone in the Standby Mode directly; (2) the cell arrays use the spare current to charge the battery; (3) the battery condition (fully charged, low, or depleted) is immaterial in the Standby Mode because the cell arrays power the mobile phone directly; and (4) the cell arrays enable unlimited Standby time.

In summary of a (1) Talk Mode operation—the cell arrays charge the battery, which powers Talk Mode; (2) the battery condition is checked to activate Talk Mode; (3) If the battery is not operational, the cell arrays charge the battery to operational level; and (4) If the battery is operational, Talk Mode is activated.

In summary of a (1) Text Messaging application, the Read (or Write) operation in text messaging application, which consumes little current, is powered directly by cell arrays; (2) the battery condition (fully charged, low, or depleted) is immaterial in the Read (or Write) operation because the cell arrays power the mobile phone directly; and (3) enabling the user to read (or write) a text message as long as it takes regardless battery condition.

In summary of Send (or Receive) operation, the battery condition is checked; (2) If the battery is not operational, the cell arrays charges the battery to operational level; and (3) If the battery is operational, the text message is sent (or received).

In summary of E-mail applications, (1) the Read (or Write) operation in E-mail application, which consumes little current, is powered directly by cell arrays; (2) the battery condition (fully charged, low, or depleted) is immaterial in the Read (or Write) operation because the cell arrays power the mobile phone directly; (3) this invention enables the user to read (or write) an email as long as it takes regardless battery condition; (4) the Send (or Receive) operation, which consumes large current, is powered by the battery; (5) if the battery is not operational, the cell arrays charges the battery to operational level; and (6) if the battery is operational, the email is sent (or received).

Also for Safety/Emergency applications: (1) Safety/Emergency situations include lost direction, traffic accident, and vehicular problem; (2) the Read (or Write) operation in safety/emergency application, which consumes little current, is powered directly by cell arrays; (3) the battery condition (fully charged, low, or depleted) is immaterial in the Read (or Write) operation because the cell arrays power the mobile phone directly; (4) a user writes a message for help; (5) a user reads a message to see the response; (6) the position data (GPS coordinates) of the mobile phone is embedded in the message; (7) this invention enables the user to read (or write) a message as long as it takes regardless battery condition; (8) the Send (or Receive) operation, which consumes large current, is powered by the battery; (9) if the battery is not operational, the cell arrays charges the battery to operational level; and (10) if the battery is operational, the message is sent (or a response is received).

In summary of a Search Engine application: (1) the Read (or Write) operation in search engine application, which consumes little current, is powered directly by cell arrays; (2) the battery condition (fully charged, low, or depleted) is immaterial in the Read (or Write) operation because the cell arrays power the mobile phone directly; (3) this invention enables the user to write an inquiry or read the response as long as it takes regardless battery condition; (4) if the battery is not operational, the cell arrays charges the battery to operational level; and (5) if the battery is operational, the inquiry is sent (or a response is received).

In summary of content broadcast applications: (1) Mobile content comprises real-time stock ticks, sport scores, traffic report, weather report, music, TV programs, and news; (2) mobile content is broadcast to multiple users in certain format; (3) mobile content may be paid by user, or by advertiser; (4) the Watch (similar to Read) operation in content broadcast application, which consumes little current, is powered directly by cell arrays; and (5) the battery condition (fully charged, low, or depleted) is immaterial in the Watch operation because the cell arrays power the mobile phone directly.

The embodiments enable nearly uninterrupted Talk time, nearly uninterrupted text messaging application, nearly uninterrupted email application, nearly uninterrupted safety/emergency application, nearly uninterrupted search engine application, and nearly uninterrupted content broadcast application.

In other aspects, search engines would use the present invention in mobile devices for texting, sound, graphics, and video. Text, voice, graphics, video and/or multi-media queries may be completed with the present invention. Mobile services would still include roadside assistance, location-based services and rescue missions. The mobile services would include text messaging, E-mail and voice dialogue powered by the cell arrays. The transportation services would include delivery service, truck stops planning/monitoring, and inventory management. The network systems would include LAN (e.g. Bluetooth, Zigbee, 802.11x, wireless router, access point); WAN (e.g. Internet, Cellular). Other energy conversion devices such as piezoelectronic generators can also be used to achieve the same effects.

It should be further stated the specific information shown in the drawings but not specifically mentioned above may be ascertained and read into the specification by virtue of a simple study of the drawings. Moreover, the invention is also not necessarily limited by the drawings or the specification as structural and functional equivalents may be contemplated and incorporated into the invention without departing from the spirit and scope of the novel concept of the invention. It is to be understood that no limitation with respect to the specific.

I claim:

1. A power management system for a mobile phone having as a primary power source a cell array and having as a backup power source a rechargeable battery, the power management system comprising:
    a first switch positioned to control power to or from the cell array; and
    a second switch positioned to control power to or from the battery supply,
    when in response to a power requirement from the mobile phone being equal to or less than an cell array power provided by the cell array, said first switch and said second switch automatically set, by the power management system, to supply the mobile phone with only said cell array power, and wherein any excess cell array power not consumed by the mobile phone is at the same time automatically directed to recharge the rechargeable battery,
    when in response to said power requirement from the mobile phone being greater than said cell array power but less than a combined power provided from the cell array and the battery, said first switch and said second switch automatically set, by the power management system, to supply the mobile phone with only said battery power provided by the rechargeable battery and said cell array power is at the same time automatically directed to recharge the rechargeable battery.

2. The system of claim 1, wherein said power management system further includes a third switch, and when said mobile phone is attached to an external charger capable of providing charger power, said third switch being set to supply said mobile phone with said charger power.

3. The system of claim 2, wherein said second switch and said third switch being set to supply said rechargeable battery with said charger power.

4. The system of claim 2, wherein said first switch and said third switch being set to supply said cell array with said charger power.

* * * * *